US006776839B2

(12) United States Patent
Ko

(10) Patent No.: US 6,776,839 B2
(45) Date of Patent: Aug. 17, 2004

(54) SLAG CEMENT

(76) Inventor: Suz-Chung Ko, Unterer Haldenweg 21A, Lenzburg (CH), CH-5600

( * ) Notice: Subject to any disclaimer, the term of this patent is extended or adjusted under 35 U.S.C. 154(b) by 0 days.

(21) Appl. No.: 10/381,949

(22) PCT Filed: Oct. 4, 2001

(86) PCT No.: PCT/IB01/02488
§ 371 (c)(1),
(2), (4) Date: Mar. 31, 2003

(87) PCT Pub. No.: WO02/28794
PCT Pub. Date: Apr. 11, 2002

(65) Prior Publication Data
US 2003/0167972 A1 Sep. 11, 2003

(30) Foreign Application Priority Data
Oct. 5, 2000 (AT) ........................................ 741/2000 U

(51) Int. Cl.$^7$ ............................. C04B 7/21; C04B 28/08
(52) U.S. Cl. ....................... 106/790; 106/695; 106/739; 106/778; 106/782
(58) Field of Search ................................. 106/695, 739, 106/778, 782, 790

(56) References Cited

U.S. PATENT DOCUMENTS 4,897,119 A    1/1990   Clarke

FOREIGN PATENT DOCUMENTS

| DE | 31 24 521 A1 | 4/1982 | ........... C04B/11/12 |
|---|---|---|---|
| EP | 000434112 A1 * | 6/1991 | |
| RU | 2096361 | 11/1997 | |
| SU | 1633093 | 3/1991 | |
| WO | WO 99/15475 | 4/1999 | ........... C04B/28/02 |

* cited by examiner

Primary Examiner—Anthony J. Green
(74) Attorney, Agent, or Firm—Chapman and Cutler LLP

(57) ABSTRACT

A slag cement having an improved early strength and containing aluminosilicates, blast furnace slag, clinker and CaSO$_4$, has a content of 70 to 95% by weight of blast furnace slag used in the ground form at >4,500 Blaine (cm$^2$/g) with no more than half of this portion being substitutable by aluminosilicates such as fly ash, alumina, marl or the like, 0.1 to 2% by weight of clinker, sulfate in amounts of below 5% by weight, calculated as SO$_3$, and 0.3 to 1% by weight of a superliquifier such as, e.g., naphthalene sulfonate.

4 Claims, 1 Drawing Sheet blast furnace slag, 10% gypsum, 0% naphthalene sulfate blast furnace slag, 5% gypsum, 0% naphthalene sulfate blast furnace slag, 5% gypsum, 0,7% naphthalene sulfate

SLAG CEMENT

The invention relates to a slag cement having an improved early strength and containing blast furnace slag, aluminosilicates, clinker and $CaSO_4$.

Slag cements of various compositions have already been known for quite some time. Slag cements, as a rule, contain a maximum of 50% by weight of blast furnace slag. Such slag cements or metallurgical cements usually contain approximately 15% by weight of $CaSO_4$ with a view to obtaining acceptable early strengths. While calcium sulfate and anhydrite contents are determining factors for early strengths, the appropriate strengths after complete hardening will be ensured by the hydration of blast furnace slag. In addition to slag sand and gypsum, such slag cements or metallurgical cements, as a rule, also contain approximately 5% by weight of clinker.

In order to obtain acceptable early strengths, no more than 50% of blast furnace slag and approximately 15% of calcium sulfate or anhydrite have so far been used for metallurgical cements, the addition of clinker having been considered as decisive for the onset of hardening.

Metallurgical cements having such compositions have already been produced for more than 60 years with but slight modifications. During the same period, the composition of blast furnace slag has, however, largely changed such that the original early strengths have not been readily obtainable with unaltered compositions.

In principle, it is conceivable to raise the portion of calcium sulfate or anhydrite in order to increase the early strength. However, such supersulfated cements, as a rule, require additional activation. Alkali activation constitutes an important cost factor with such cement compositions. Alkali-activated supersulfated cements containing high portions of cement kiln dusts are described in WO 00/00447. In the event of such cements, it has already been proposed to replace part of the blast furnace slag with fly ashes or clays including no more the 5% by weight of $Al_2O_3$, with alkali metal salts and alkali hydroxides for activation, and $CaSO_4$ in amounts of more than 5% by weight, having been added in order to attain the desired strength properties.

The invention aims to provide a metallurgical cement of the initially defined kind, with which high early strengths at low $CaSO_4$ or anhydrite contents can be obtained. To solve this object, the slag cement or metallurgical cement according to the invention is essentially characterized by a content of 70 to 95% by weight of blast furnace slag used in the ground form at >4,500 Blaine ($cm^2/g$) with no more than half of this portion being substitutable by aluminosilicates such as fly ash, alumina, marl or the like, 0.1 to 2% by weight of clinker, sulfate in amounts of below 5% by weight, calculated as $SO_3$, and 0.3 to 1% by weight of a superliquifier such as, e.g., naphthalene sulfonate. It has now been surprisingly shown that, with the composition according to the invention, the portion of accordingly finely ground blast furnace slag can be substantially increased and an appropriate early strength can be obtained at a substantially reduced portion of calcium sulfate, if 0.3 to 1% by weight of a superliquifier like naphthalene sulfonate is added while the portion of clinker is reduced, so that surprisingly high early strengths will be observed at a reduced quantity of calcium sulfate and a reduced quantity of clinker amounting to 0.1 to 2% by weight. This unexpected effect is supposed to be partially due to the fact that, by the addition of a superliquifier like naphthalene sulfonate, substantially lower water/cement ratios can be applied without losing any of the flow properties. At the same time, the decrease of the clinker content as compared to conventional compositions apparently causes $Al_2O_3$ to form ettringite as a hydration product from the portion of blast furnace slag or the aluminosilicates, respectively, which reacts with sulfate, whereby the early strength is substantially improved. A higher portion of clinker will necessarily result in a higher portion of CaO, and that is supposed to cause an inhibition of $Al_2O_3$ dissolution and hence a poorer early strength development. Yet, no clinker at all would entail a substantial deterioration of the early strength. At the same time, the limitation of the $CaSO_4$ portion to values of far below 15% guarantees that a cost-intensive and cumbersome alkali activation aimed to increase the early strength will become dispensable. Overall, it has also turned out in a surprising manner that blast furnace slag can be used in amounts of up to 95% by weight without any loss of the early strength, if the marginal conditions for the clinker content and the sulfate content as well as the portion of superliquifier are, at the same time, observed. In respect to strength development, it is of decisive importance to use an accordingly fine blast furnace slag sand, and the cement mixture according to the invention is, therefore, devised such that blast furnace slag is used in the ground form at >4,500 Blaine ($cm^2/g$). Such a finely ground slag sand, together with slight portions of a superliquifier and, in particular, naphthalene sulfonate in amounts ranging from 0.3 to 1% by weight, will result in a particularly good processability of the mixture with high early strengths and high final strengths being attained. In order to promote the formation of ettringite, the amount of gypsum or calcium sulfate or anhydrite must be accordingly limited, as already mentioned in the beginning.

The metallurgical cement or slag cement according to the invention advantageously contains clinker in an amount of approximately 1% by weight.

Especially high final strengths and an excellent processability will be ensured in that blast furnace slag at >5,000 $cm^2/g$ Blaine is used with gypsum being preferably employed in amounts of <5% by weight.

In the following, the invention will be explained in more detail by way of the strength developments of different compositions.

BRIEF DESCRIPTION OF THE DRAWING

In FIG. 1, blast furnace slag having a grinding fineness of 5000 $cm^2/g$ Blaine was supplemented with 10% gypsum, and clinker was added. FIG. 1 depicts three curves for the strength behavior as a function of the clinker portion after 1 day, after 2 days and after 7 days, and it is apparent that the maximum final strengths can be obtained within a range of between 1 and 2% by weight of clinker. This mixture was, however, characterized by unfavorable processing qualities, requiring a relatively high water/cement ratio.

Figure 1:
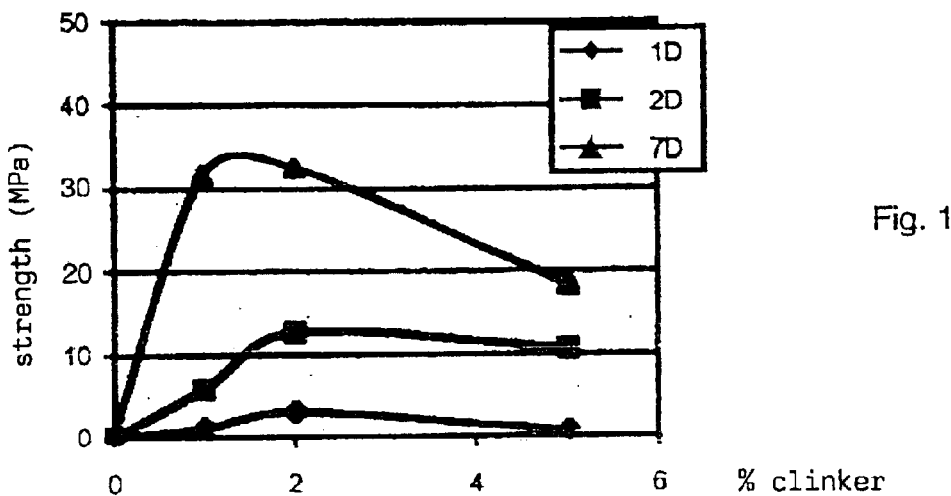
FIG. 1 of the drawing illustrates the strength course of a mixture of blast furnace slag and 10% $CaSO_4$ as a function of the clinker portion.
Figure 2:
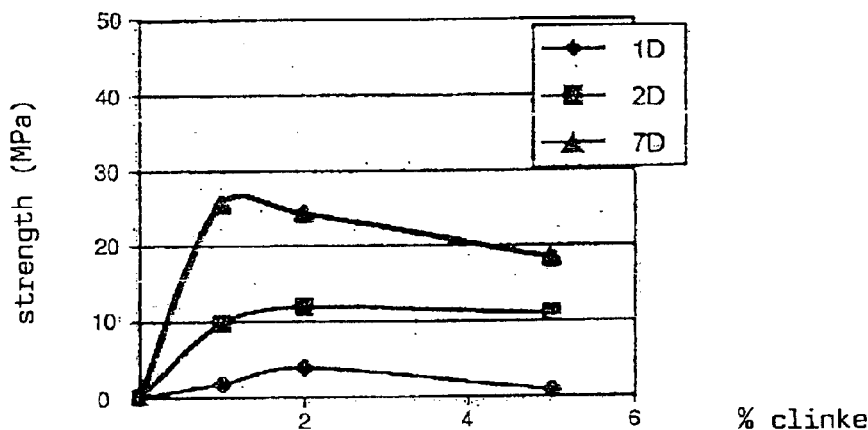
FIG. 2 shows the strength course of blast furnace slag, 10% gypsum and 0.7% naphthalene sulfonate as a function of the clinker portion.
Figure 3:
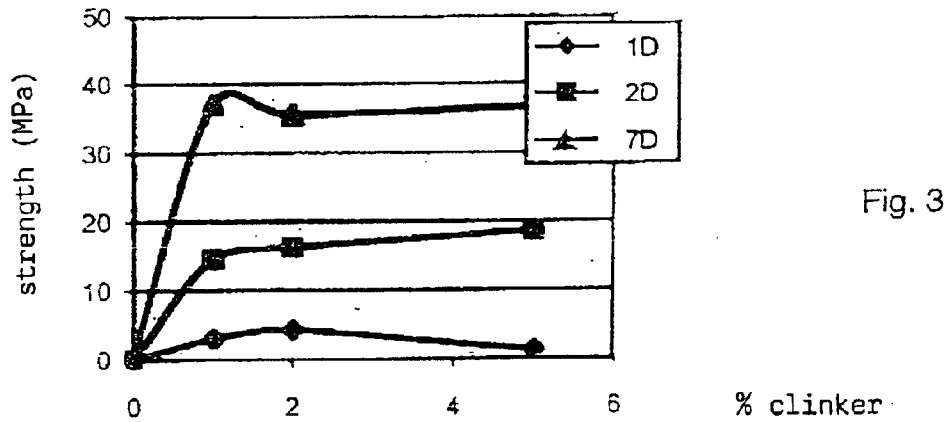
FIG. 3 depicts the strength course of a slag cement according to the invention, which contains blast furnace slag, 5% $CaSO_4$ and 0.7% naphthalene sulfonate, as a function of the clinker content, in weight %.

For the mixtures according to FIGS. 2 and 3, 5% by weight of gypsum was used in each case. The addition of 0.7% by weight of naphthalene sulfonate yielded a higher early strength with a maximum between 1 and 2% by weight of clinker at a simultaneously higher final strength, as illustrated in FIG. 3.

In the main, it has, thus, been surprisingly shown that a readily processable slag cement including portions of blast furnace slag sand ranging between 85 and 89% by weight could be obtained at a limitation of the clinker portion to values of between 1 and 2% and a simultaneously low portion of gypsum. As opposed to previous views that early strengths could only be a matter of elevated calcium sulfate or anhydrite portions, it has become feasible by the composition according to the invention to obtain a good processability and high early strengths at substantially reduced portions of calcium sulfate.

What is claimed is:

1. A slag cement having an improved early strength and containing blast furnace slag, clinker and $CaSO_4$, wherein said slag cement has a content of:

70 to 95% by weight of blast furnace slag used in the ground form at >4,500 Blaine ($cm^2/g$), wherein up to half of said blast furnace slag is substitutable by aluminasilicates;

0.1 to 2% by weight of clinker;

<5% by weight of sulfate, calculated as $SO_3$; and 0.3 to 1% by weight of napthalene sulfonate.

2. A slag cement according to claim 1, wherein said slag cement has a content of approximately 1% by weight of clinker.

3. A slag cement according to claim 1, wherein said blast furnace slag is used in the ground form at >5,000 $cm^2/g$ Blaine.

4. A slag cement according to claim 2, wherein said blast furnace slag is used in the ground form at >5,000 $cm^2/g$ Blaine.

* * * * *